(12) United States Patent
Yasuda et al.

(10) Patent No.: US 8,321,485 B2
(45) Date of Patent: Nov. 27, 2012

(54) DEVICE AND METHOD FOR CONSTRUCTING INVERTED INDEXES

(75) Inventors: Tomohiro Yasuda, Kokubunji (JP);
Makoto Iwayama, Tokorozawa (JP);
Osamu Imaichi, Koganei (JP)

(73) Assignee: Hitachi, Ltd., Tokyo (JP)

( * ) Notice: Subject to any disclaimer, the term of this patent is extended or adjusted under 35 U.S.C. 154(b) by 761 days.

(21) Appl. No.: 11/936,277

(22) Filed: Nov. 7, 2007

(65) Prior Publication Data
US 2008/0133565 A1    Jun. 5, 2008

(30) Foreign Application Priority Data

Nov. 8, 2006 (JP) .................................. 2006-303195
Mar. 19, 2007 (JP) .................................. 2007-070697

(51) Int. Cl.
*G06F 7/00* (2006.01)
*G06F 17/00* (2006.01)
*G06F 17/30* (2006.01)

(52) U.S. Cl. ......... 707/830; 707/741; 707/742; 707/746
(58) Field of Classification Search .................. None
See application file for complete search history.

(56) References Cited

U.S. PATENT DOCUMENTS

| | | | | |
|---|---|---|---|---|
| 5,781,903 A * | 7/1998 | Rusterholz | ..................... | 707/742 |
| 6,057,790 A | 5/2000 | Igata et al. | | |
| 6,839,799 B2 * | 1/2005 | Kumar et al. | ................. | 711/108 |
| 7,080,091 B2 * | 7/2006 | Matsuda | ........................ | 707/102 |
| 7,319,994 B1 * | 1/2008 | Sercinoglu | ............................ | 1/1 |
| 7,376,642 B2 * | 5/2008 | Nayak et al. | ........................... | 1/1 |
| 7,487,141 B1 * | 2/2009 | Stephan | ................................ | 1/1 |
| 2007/0198621 A1 * | 8/2007 | Lumsdaine et al. | ........... | 708/200 |

FOREIGN PATENT DOCUMENTS

| | | |
|---|---|---|
| JP | 06-243009 | 9/1994 |
| JP | 2001-312517 | 11/2001 |
| JP | 2005-129071 A | 5/2005 |

OTHER PUBLICATIONS

Elias, Peter, "Universal Codeword Sets and Repesentations of the Integers", IEEE Transations on Information Theory, Vo. IT-21, No. 2, Mar. 1975, pp. 194-203.
Golomb, S., "Run-Length Encodings", IEEE Transations on Information Theory, IT-12 (3), 1966, pp. 399-401.

(Continued)

*Primary Examiner* — Susan Chen
(74) *Attorney, Agent, or Firm* — Mattingly & Malur, PC

(57) ABSTRACT

To achieve high speed document search, an inverted index is compressed at high compressibility by an encoding method decodable in a high process speed. In compressing an identification number of a document to obtain a byte sequence by the variable byte method, w bits are used to represent the number of occurrences of the indexing term in the document, and x bits are used to represent additional information of the posting, where x and w are integers given as parameters. When the number of occurrences cannot be represented within w bits, a certain value indicating a numeric value that cannot be represented by w bits is stored is written to the said w bits, and anther byte sequence that represents the value by the variable byte method follows. Additionally provided is a means for reading a compressed posting from any position of a list of postings called inverted lists, allowing a binary search on an inverted list.

16 Claims, 16 Drawing Sheets

OTHER PUBLICATIONS

Scholer, Falk et al, "Compression of Inverted Indexes for Fast Query Evaluation", Proc. 25$^{th}$ Ann. Int'l ACM SIGIR Conf., 2002, pp. 222-229.

Williams, Hugh E. et al, "Compressing Integers for Fast File Access", The Computer Journal, Vo. 42, No. 3, 1999, pp. 193-201.

Anh, Vo Ngoc et al, "Inverted Index Compression Using Wood-Aligned Binary Codes", Information Retrieval, No. 8, 2000, pp. 151-166.

Ahn, Vo Ngoc et al, "Concise Papers—Improved Word-Aligned Binary Compression for Text Indexing", IEEE Transactions on Knowledge and Data Engineering, vol. 18, No. 6, Jun. 2006, pp. 857-861.

Witten, I.H. et al, "Managing Gigabytes: Compressing and Indexing Documents and Images", Morgan Kaufmann, 2$^{nd}$ Ed., San Francisco, 1999, Chapter 4, pp. 178-179.

* cited by examiner bb=01: frequency is 1 bb=10: frequency is 2 bb=11: frequency is 3 bb=00: frequency is less than 1 or more than 3

(followed by exact value of frequency in variable byte representation.)

DEVICE AND METHOD FOR CONSTRUCTING INVERTED INDEXES

CLAIM OF PRIORITY

The present application claims priority from Japanese applications JP 2007-070697 filed on Mar. 19, 2007, and JP 2006-303195 filed on Nov. 8, 2006, the contents of which are hereby incorporated by reference into this application.

BACKGROUND OF THE INVENTION

1. Field of the Invention

The present invention relates to a compression method of an inverted index for performing high-speed full text search on a large-scale document set, and also relates to a search method by use of the inverted index.

2. Description of the Related Art

In the modern society, an enormous amount of electronic documents are generated every day, and the amount is continuously increasing. They are essential for daily business. The expansion of the Internet is one factor regarding the rapid increase in electronic documents. Along with the increase in the amount of electronic documents, document search techniques for searching for useful information amongst huge amounts of documents in a short period of time have become a necessity, and technical developments thereof have advanced.

FIG. 1 is a schematic view of a document set that consists of search targets, and an inverted index constructed on the basis of the document set. A typical document search style technique searches for documents including given keywords, out of a given document set 101 in a minimum time period. A data structure called an inverted index 102 is used for this purpose. When a word 103 occurs in a document 104, a pair composed of a document identification number 105 (referred to as docID in the rest of this specification) and a number of occurrences 106 (referred to as frequency in the rest of this specification) of the word in the document is referred to as a posting 107. A data structure storing a list of all postings on every word in the search target document set is called the inverted index 102.

Although in postings frequencies are sometimes omitted depending on the application, the inverted index of the present specification includes frequencies. This is because they are often required to calculate an importance score of the retrieved document. Meanwhile, although a posting sometimes additionally includes locations where the corresponding word occurs, the technique of the present specification is applied to a portion of postings consisting of a docID and a frequency.

Unlike languages such as English, French and Spanish where words are separated with spaces, in Japanese, Korean and Chinese, a sentence is difficult to be divided into words in an accurate manner. Hence, in some cases an inverted index is constructed by using, instead of a word, an arbitrary substring consisting of n contiguous letters called an n-gram which is known to be effective (See "Jyouhou kensaku arugorizumu (information search algorithm)" Kenji Kita and others, Kyoritsu Shuppan co., ltd). Here, n is mainly an integer of 1 to 10. A word and a substring having a length n are referred to as an indexing term in the present specification.

A docID and a frequency constituting a posting are each represented by an integer value. In the case where an integer value is represented as a byte sequence of fixed length without being compressed, 4 bytes are necessary to represent a single integer value if a numeric value is represented in 32 bits. However, there are several known techniques by which a numeric value is represented in less than 32 bits. The Elias gamma code (Non-patent Document 1) is a method by which a small numeric value can be represented in a small number of bits, and is appropriate for compressing the frequency an indexing term. Although the Elias gamma code can be similarly used for compressing a docID, the Elias delta code (Non-patent Document 1) is more appropriate since specification numbers are not as concentrated to small numbers as are the occurrence frequencies. An integer value can also be compressed by use of a variable-length bit sequence in the Golomb code (Non-patent Document 2) and the Rice code (Non-patent Document 3), of which the processing speed and compression rate are said to be better than Elias gamma and delta codes.

There is also a known method in which an integer value is represented in a byte sequence of variable length. In variable byte method (Non-patent Document 3 and 4), a numeric value is represented in the binary code, and every 7 bits are stored in a byte sequence 202 of variable length. FIG. 2 is a diagram showing an example of an integer value compressed by the variable byte method. The most significant bit 201 is used to determine whether or not the 1 byte including this bit is at the end of the byte sequence. The byte of which the most significant bit 201 is 1 is not a byte at the end of the byte sequence 202. In contrast, a byte of which the most significant bit 201 is 0 is at the end of the byte sequence 202. The meaning of 0 and 1 indicated by the most significant bit 201 may be reversed. The example in FIG. 2 shows a case of compressing an integer 123456 (0000111 1000100 1000000, in binary number representation) by the variable byte method. Here, since the integer can be represented in 3 bytes, 3/4=75% compression is accomplished if the original integer 123456 is recorded in 32 bits. Although encoding 123456 is performed sequentially from left to right (the most significant bits to the least significant bits) in the example of FIG. 2, encoding may alternatively be performed from right to left (the least significant bits to the most significant bits). The merit of the variable byte method lies in the fact that high speed processing is made possible because of a simple decoding process.

A technique is known in which encoding is performed not only on a byte sequence, but performed at a time such that multiple postings are packed into a computer word that consists of 32 bits or 64 bits of computer words (Non-patent Document 5). By extending the technique in Non-patent Document 5, a technique is proposed in which encoding is performed across boundaries of computer words (Non-patent Document 6). Other known techniques for compactly representing an inverted index for full text search are disclosed in Patent Documents 1 and 2. Moreover, Non-patent Document 7 discloses a technique for retrieving postings related to a specific document in an inverted list at high speed, by dividing a list of postings prepared for each word, that is, an inverted list 108 (FIG. 23), into multiple blocks of the same size, and by performing a binary search thereon.

[Patent Document 1] Japanese Patent Application Laid-open Publication No. 2001-312517

[Patent Document 2] Japanese Patent Application Laid-open Publication No. Hei 6-243009.

[Non-patent Document 1] P. Elias, Universal codeword sets and representations of the integers, IEEE Transactions on Information Theory, IT-21(2):194-203, 1975.

[Non-patent Document 2] S. Golomb, Run-length encodings, IEEE Transactions on Information Theory, IT-12(3):399-401, 1966.

[Non-patent Document 3] E Scholer, H. E. Williams, J. Yiannis and J. Zobel, Compression of Inverted Indexes for Fast Query Evaluation, Proc. 25th Ann. Int'l ACM SIGIR Conf. Research and Development in Information Retrieval, pp. 222-229, 2002.

[Non-patent Document 4] H. Williams and J. Zobel, Compressing integers for fast file access, Computer Journal, 42(3):193-201, 1999.

[Non-patent Document 5] V. N. Anh and A. Moffat, Inverted Index Compression Using Word-Aligned Binary Codes, Information Retrieval, 8(1):151-166, 2005.

[Non-patent Document 6] V. N. Anh and A. Moffat, Improved Word-Aligned Binary Compression For Text Indexing, IEEE Transactions on Knowledge and data engineering, 18(6):857-861, 2006.

[Non-patent Document 7] I. H. Witten, A. Moffat, and T. C. Bell, Managing Gigabytes: Compressing and Indexing Documents and Images, second ed. San Francisco: Morgan Kaufmann, 1999.

SUMMARY OF THE INVENTION

In order to achieve high speed document searching, a data structure for an inverted index faces a trade-off between two requirements. First, it is preferable that the data structure of an inverted index be simple in order to make high speed access possible. In a case of placing the inverted index in a computer memory, the time for reading the inverted index can be shortened by making the data structure simple and plain. On the other hand, it is also preferable to compress and make the inverted index as small as possible. When handling a large-scale document set, an inverted index is often placed in an auxiliary storage unit. However, with the reduction of data size, on-memory processing is made possible, and search speed can be improved dramatically. Even if the whole inverted index cannot be placed onto the memory, search speed can be improved considerably by placing a portion of the index that is frequently accessed, onto the memory. Additionally, with a reduction of the area taken by the inverted index in the auxiliary storage unit, the document search system can be operated with a small storage.

Performance of a compression method for an inverted index depends largely on the compression method for the postings which make up a large proportion of the index. As mentioned above, a posting consists of a docID and a frequency of an indexing term. In order to achieve high speed searching and compact data size, the numeric value data needs to be compressed with an appropriate method. Moreover, according to the search target, documents of a document set are frequently added and updated in some cases. As a countermeasure, a compression method is preferable where nothing can be assumed based on the distribution of docIDs.

Furthermore, to accelerate an advanced search such as a Boolean search and a phrase search by a binary search (See "Arugorizumu to deta kouzou (data structure and algorithm)", Tomio Hirata, Morikita Publishing), the data structure is preferably constructed so that a posting can be read from an arbitrary position in the data structure of the inverted list 108. For this purpose, the amount of data to be added needs to be reduced.

As an integer value is represented in a bit sequence of a variable length in the compression methods according to the Elias gamma and delta codes, compression rates thereof are high. However, a considerable amount of time is required for decoding. As for the Golomb code and the Rice code, the methods are not effective if a parameter depending on the distribution of docIDs is not given appropriately in advance.

The variable byte method has a drawback of requiring, even as a small value, at least 1 byte, and is not appropriate for compressing the frequency of indexing terms, as compared to methods by which an integer is represented by a bit sequence of variable length.

In the technique disclosed in Non-patent Document 5, compression of the frequencies of words in each document is not considered. The above problem for Non-patent Document 5 is not solved by the technique in Non-patent Document 6. In Patent Document 1, only the docID is compressed, and the frequency of an indexing term is not taken into consideration. Patent Document 2 discloses a technique related to compression of a docID and an occurrence location of a word in the document, and not a technique for compressing a posting consisting of a docID and a frequency. The technique disclosed in Non-patent Document 7 has a problem that memory or storage space is wasted by unused regions at the end of each block, and that binary searching cannot be performed within a block.

An object of the present invention is to provide a compression method of which the compression rate is comparable with known methods such as Elias gamma, delta, Golomb, or Rice methods that utilize variable-length bits, while decoding can be done in a high speed in order for a high-speed document search. Moreover, the present invention also provides a means for making it possible to recognize a boundary of the posting even when the inverted list is read from any position.

The present invention is an extension of the variable byte method. Although postings are represented by byte sequences, the frequency of an indexing term is stored in a small number of bits. At least 1 byte is required for simply compressing the frequency by the original variable byte method. However, the frequency of a certain indexing term in a single document is often 3 or less, and can be represented by 2 bits. In this regard, the present invention provides a bit field 301 (referred to as a frequency field below) of w bits length for representing the frequency in a byte sequence representing a docID, as shown in FIG. 3. Here, w is a parameter. It is preferable that w be at most 8 so as to be contained in 1 byte, and that the value be made as small as possible to improve compressibility. Although w is preferably set to 2 for representing a frequency of 3 or less, if the frequency is mostly 1, w may be set to 1. Hence, when the frequency is up to a value obtained by subtracting 1 from the w-th power of 2, the value can be embedded to the byte sequence representing the docID and be encoded. Meanwhile, to represent a frequency larger than the value obtained by subtracting 1 from the w-th power of 2, a certain value is written to the bit field of w bits, and a variable byte representation of the frequency is located in a latter portion.

In some cases, a posting is required to record additional information other than a docID and a frequency of an indexing term. An assumable example is a flag in the inverted index that indicates that a posting corresponding to a certain document has become invalid when the document is removed from the document set 101. In this regard, the present invention provides a bit field 401 (referred to as an additional information field below) of x bits for writing additional information of a posting, in addition to the bit field 301 for representing the frequency in the byte sequence representing the docID. Here, the x bits form a parameter for additional information.

To pack a frequency field and an additional information field into a single byte, x+w should be a positive integer no greater than 8. If x+w is greater than 8, a posting is preferably followed by adding a byte sequence of fixed length storing the remainder of the frequency and additional information fields, as shown in FIG. 13. In this case, the final byte of the byte sequence of variable length can be similarly indicated by use of the most significant bit 201.

Incidentally, by providing bit fields for frequencies and additional information, a shortage may occur for bits representing the docID. Thus in some cases, an additional 1 byte becomes necessary although x+w is less than 8. Even in such cases, the increase in data size is small as compared to a case of permanently adding one byte for representing the frequency and additional information.

Moreover, by slightly altering the byte format of postings to the one shown in FIG. 16, the present invention allows an inverted index to be read from any position in addition to its beginning. In a byte sequence 1603 representing the frequency in this example, the most significant bit 1601 of each byte is fixed to 1 in order to prevent the byte from being confused with the byte sequence representing the docID. Meanwhile, the subsequent bit 1602 is used to indicate whether or not the byte is the final byte of the byte sequence representing the frequency.

ADVANTAGES OF THE INVENTION

The present invention provides a data mechanism for an inverted index by which the frequency of an indexing term in a document is represented mostly in a small number of bits such as less than 1 byte, while allowing high speed access by codes in byte units. Additionally, a means is provided for recognizing a boundary of postings that allows the inverted index to be read from any position in addition to its beginning, and thus makes it possible to perform a binary search. In this way, when searching for a posting corresponding to a specific document in the inverted list of each indexing term, the posting can be found in a short period of time if the posting corresponding to the document exists, and if not, the fact that the posting does not exist can be recognized in a short period of time.

DESCRIPTION OF REFERENCE NUMERALS

Figure 1:
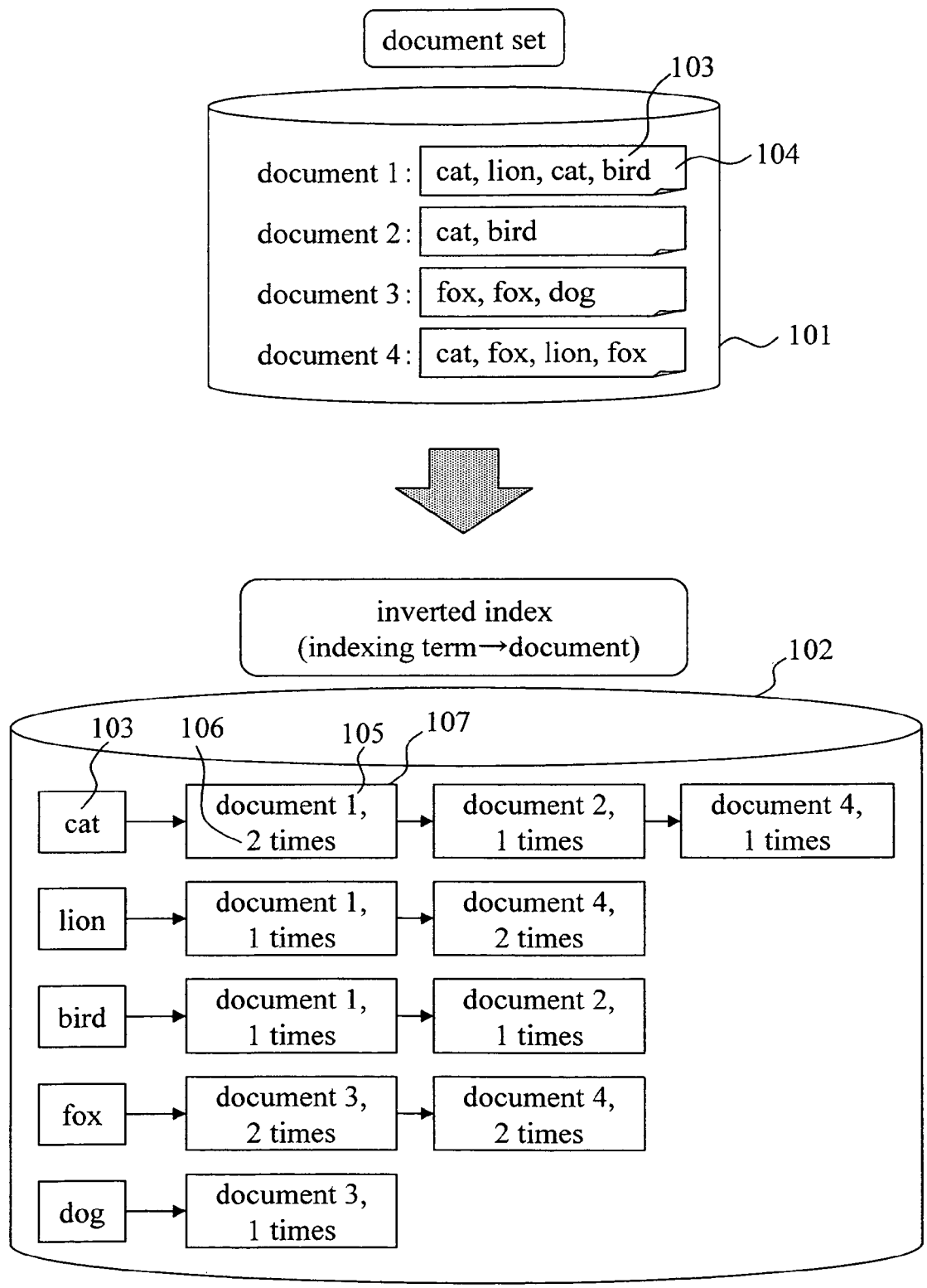
FIG. 1 is a schematic view of a document set that is a search target, and an inverted index constructed on the basis of the document set.
Figure 2:
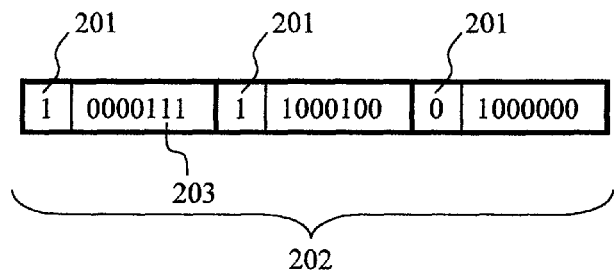
FIG. 2 is a diagram showing an example of an integer value compressed by the variable byte method.
Figure 3:
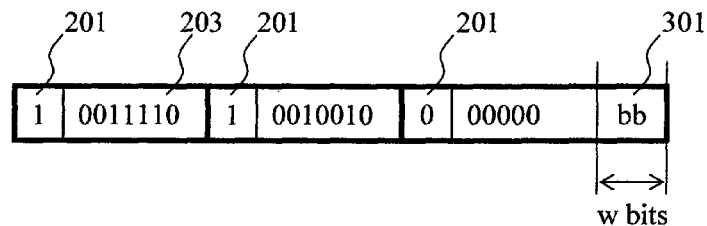
FIG. 3 is a diagram showing an example of a posting compressed by the method of the present invention.

101: search target document set
102: inverted index
103: indexing term
104: search target document
105: document identification number (docID)
106: number of occurrences (frequency)
107: posting
108: inverted list
201: bit indicating whether or not each of the bytes is an end of the byte sequence
202: variable byte expression for integer 123456
203: bit area expressing an integer to be compressed
301: frequency field
401: additional information field
402: byte sequence expressing posting compressed by the method of present invention
501: byte sequence indicating the frequency represented by the variable byte method
601: central processing unit (CPU)
602: main memory
603: auxiliary storage unit
604: removable media
605: network
606: user terminal
607: compressed inverted index
1401: data used as an end mark of a posting list for an indexing term
1601: bit expressing the byte is not the end of the docID
1602: bit indicating whether or not the byte is the final byte of the byte sequence expressing the frequency
1603: byte sequence representing the frequency
1701: bit indicating whether or not the byte is the final byte of the byte sequence expressing the frequency
1702: bit expressing the byte is not the end of the docID
1703: byte sequence representing the frequency

DESCRIPTION OF THE PREFERRED EMBODIMENT

A description will be given for an example of compressing postings by a method of the present invention.

Embodiment 1

Figure 4:
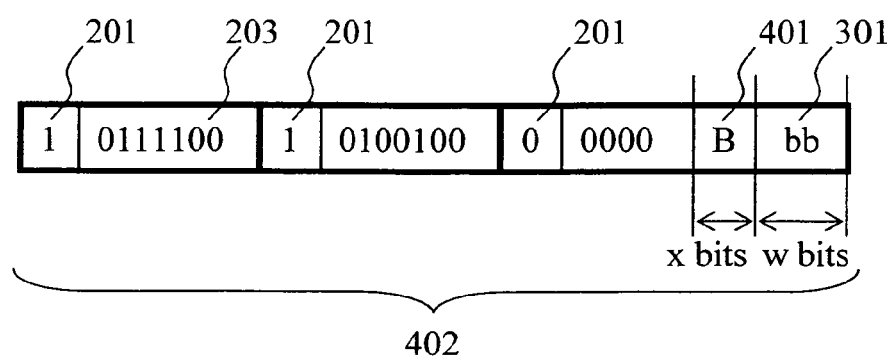
FIG. 4 is a diagram showing an example of a posting compressed by the method of the present invention.
Figure 5:
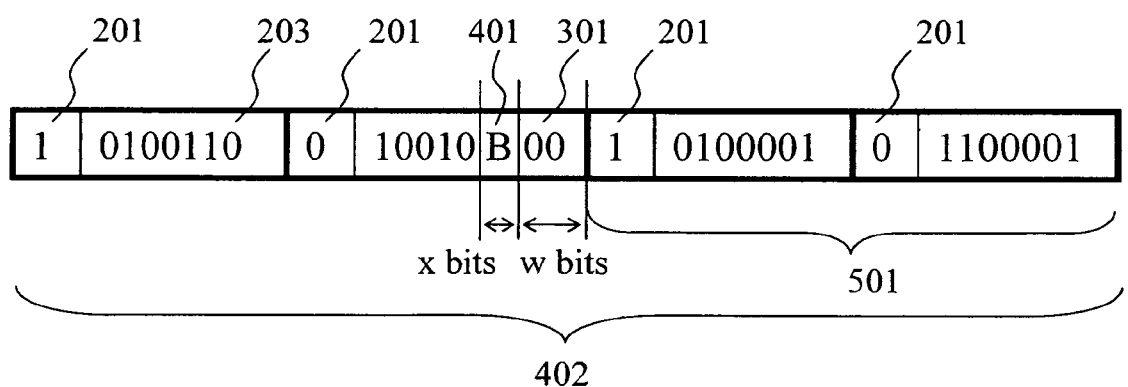
FIG. 5 is a diagram showing an example of a posting compressed by the method of the present invention.

As shown in FIG. 4, in representing a docID by the variable byte method, the least significant w bits 301 of the final 1 byte are used to record the frequency, and x bits 401 on the left side (the significant side) are used to record additional information. Although this diagram shows an example where w=2 and x=1, values for w and x are not limited to 2 and 1 in the present invention. In a case where the frequency is not more than a value obtained by subtracting 1 from the w-th power of 2, the frequency field of w bits itself becomes the binary representation of the frequency. In a case of recording a frequency not less than the w-th power of 2, 0 is written to all bits in the frequency field 301 to imply that the frequency is one that cannot be represented by w bits. Then, a byte sequence 501 indicating the frequency and represented by the variable byte method follows the byte that contains the frequency field 301. FIG. 5 shows an example of an encoded posting which consists of a docID 1234 (100110 10010 in binary numbers) and a frequency 4321 (0100001 1100001 in binary numbers).

Figure 6:
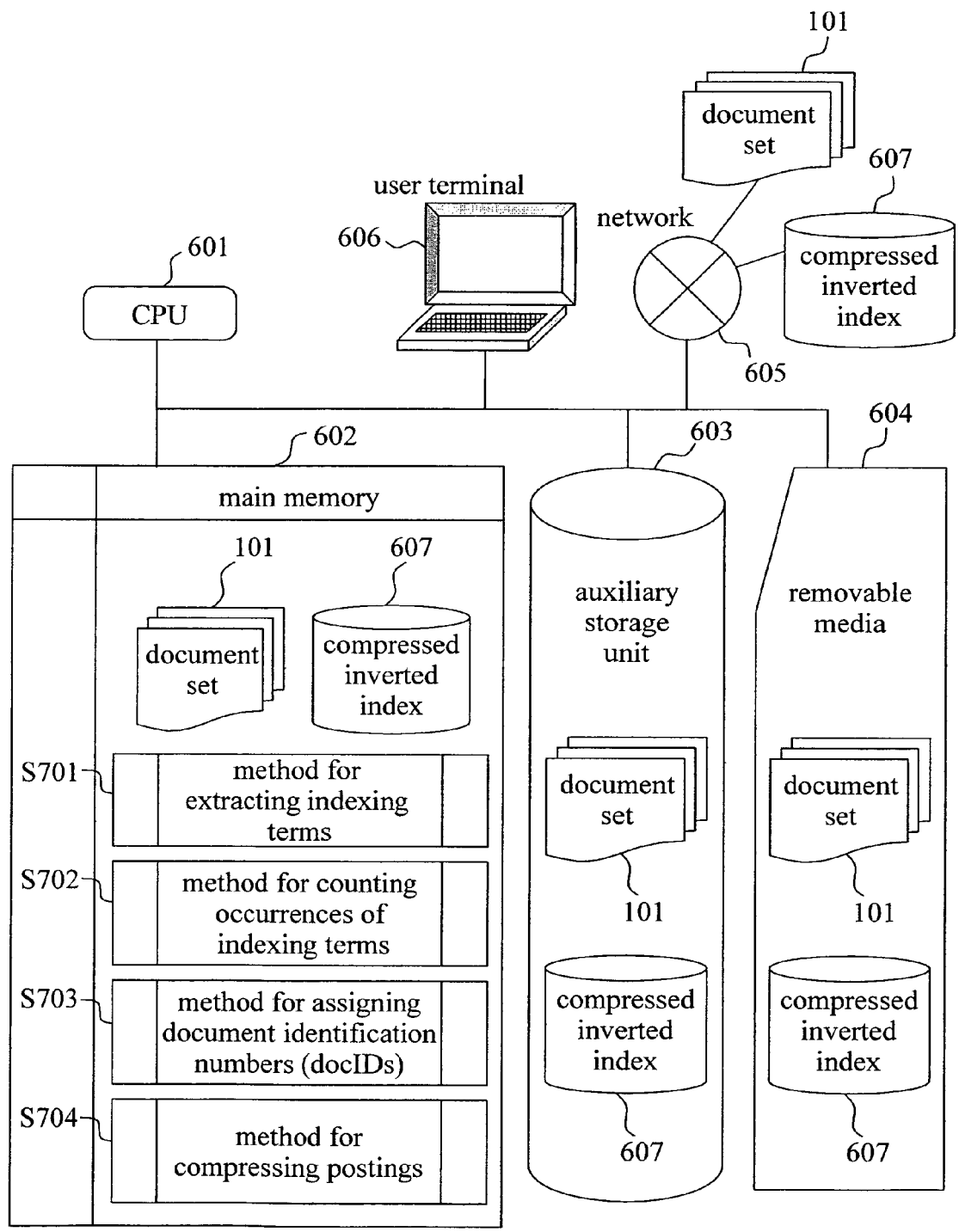
FIG. 6 is a schematic view showing one example of an apparatus implementing the present invention.

Next, a description will be given for an embodiment of an apparatus for generating an inverted index compressed by the method of the present invention. A schematic view of the whole apparatus is shown in FIG. 6. A main memory 602 is connected to a central processing unit (CPU) 601. According to need, an auxiliary storage unit 603, a removable media 604 such as a CD-ROM and a DVD, a network 605 and a user terminal 606 are connected to the CPU 601. The apparatus of the present embodiment is provided with a program executed by the CPU 601 on the main memory 602, the program including: a method for extracting indexing terms S701; a method for counting occurrences of indexing terms S702; a method for assigning docIDs S703; and a method for compressing postings S704.

Figure 7:
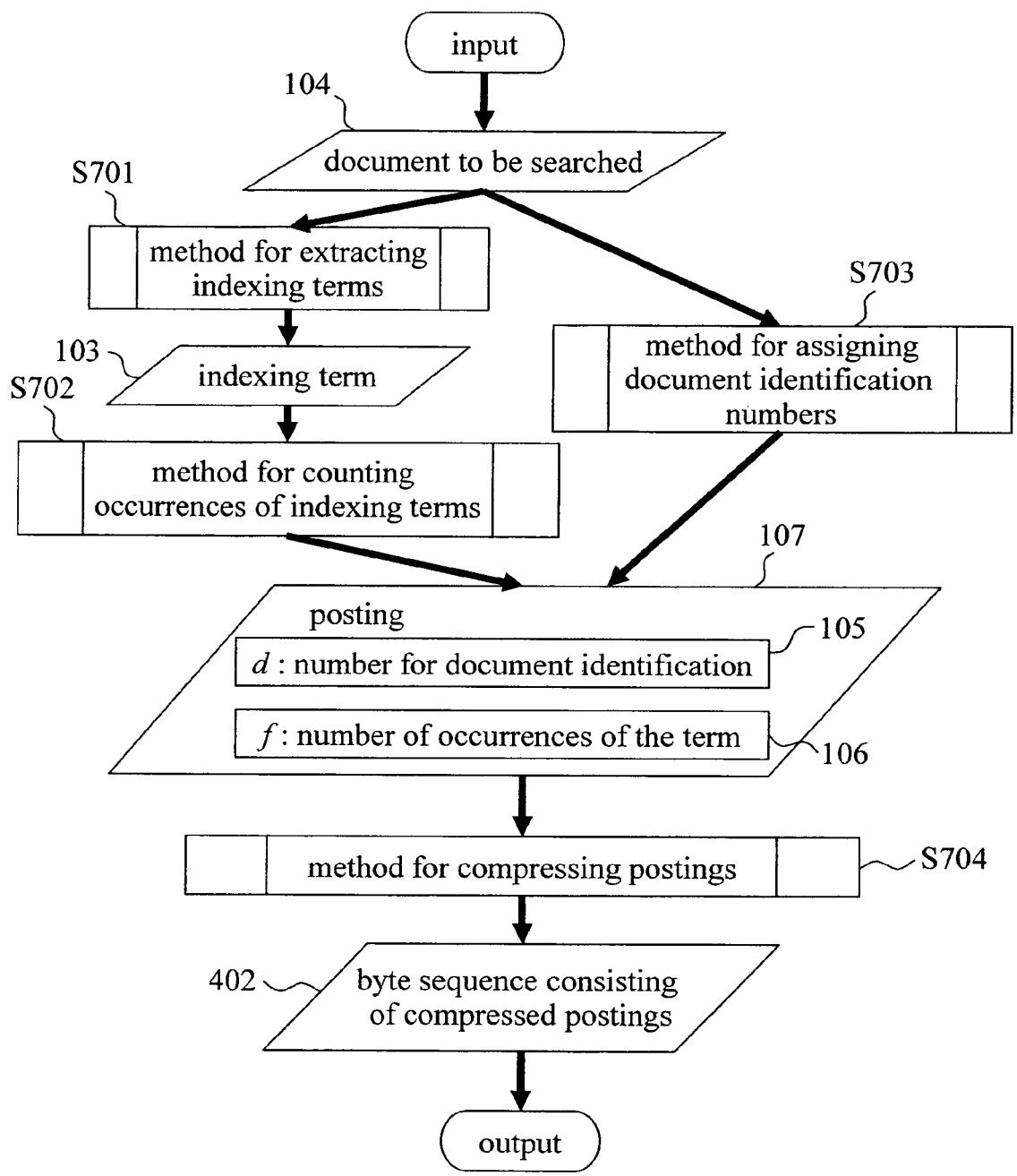
FIG. 7 is a diagram showing a flow of data and processing of the embodiment of the apparatus implementing the present invention.

FIG. 7 shows data and flow of processing of the apparatus. To begin with, the CPU 601 obtains a search target document 104 as an input, from the search target document set 101 placed in the main memory 602, the auxiliary storage unit 603, the removable media 604, and the network 605, according to need. Two kinds of processes are performed on each of the obtained search target document 104. Firstly, an indexing term in the document is extracted by the method for extracting indexing terms S701. As a method for extracting indexing terms, known morphological analysis methods or the n-gram may be used (See "Jyouhou kensaku arugorizumu (information search algorithm)" Kenji Kita and others, Kyoritsu Shuppan co., ltd). Additionally, the number of occurrences of each indexing term 103 in the document 104 being a search target is obtained by the method for counting occurrences of indexing terms S702. In order to obtain the number of occurrences, an integer variable having been initialized to 0 may simply be prepared for each indexing term, and be incremented every time an occurrence of the indexing term is detected in the document. Moreover, a docID is assigned to every search target document by the method for assigning docIDs S703. A preferable example of this method is to retain an integer variable initialized to 1, assign the value of this variable when a new docID is required, and to increment the value of this variable immediately after assigning a value. By the methods S701, S702 and S703, a posting 107 consisting of a docID 105 and a frequency of an indexing term 106 can be obtained for each indexing term. Each of these postings is compressed by the method for compressing postings S704, and then a resultant byte sequence 402 is outputted, according to need, to compressed inverted indexes 607 placed in the main memory 602, the auxiliary storage unit 603, the removable media 604, and the network 605.

Figure 8:
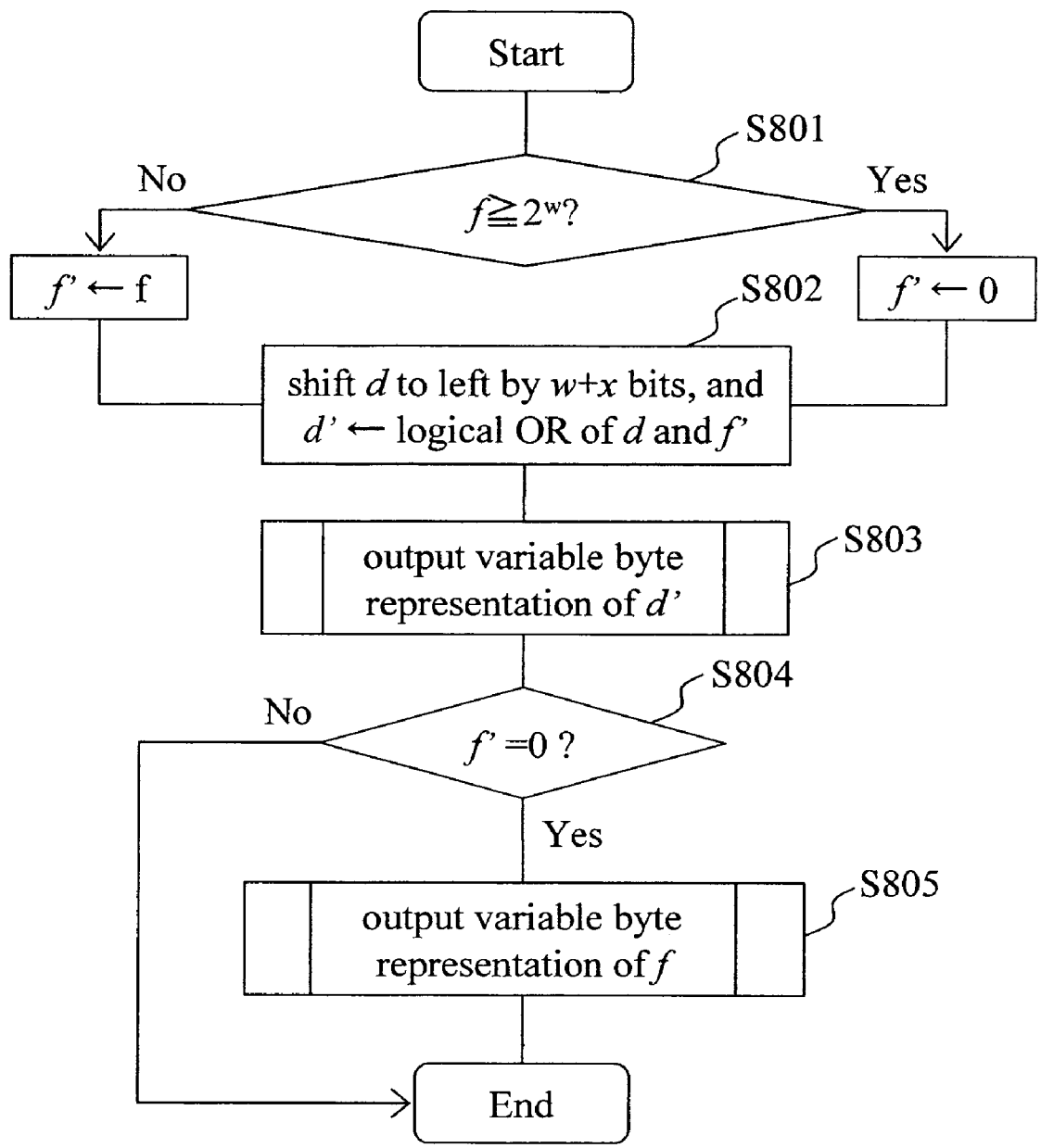
FIG. 8 is a flowchart illustrating an example of a process of a method for compressing postings of the present invention.

FIG. 8 shows a flow of processing executed by the method for compressing postings S704. As an input, given are both of a docID d 105 and a frequency of indexing term f 106 that consist of a posting, and integers x and w which are parameters. Firstly, the method for compressing postings S704 determines a value f' to be stored in the frequency field 301 of the byte sequence 402 to be outputted. In step S801, a judgment is made on whether or not f can be represented by w bits. If possible, this step sets f' to f, and if not, it sets f' to 0. Next in step S802, d and f' are combined into an integer d'. With respect to this integer d', the least significant w bits thereof are equal to f', and a value obtained by removing the least significant x+w bits therefrom is equal to d. In step S803, a variable byte representation of this integer d' is outputted. The method of outputting a variable byte representation of an integer will be described later. Then, in step S804, a determination is made on whether or not f can be represented by w bits, by referring to whether f'=0 or not. If f'≠0, f can be represented by w bits and the compression processing is terminated. Otherwise, if f'=0, this means that f cannot be represented by w bits and the value of f is outputted in a variable byte representation in step S805.

Figure 9:
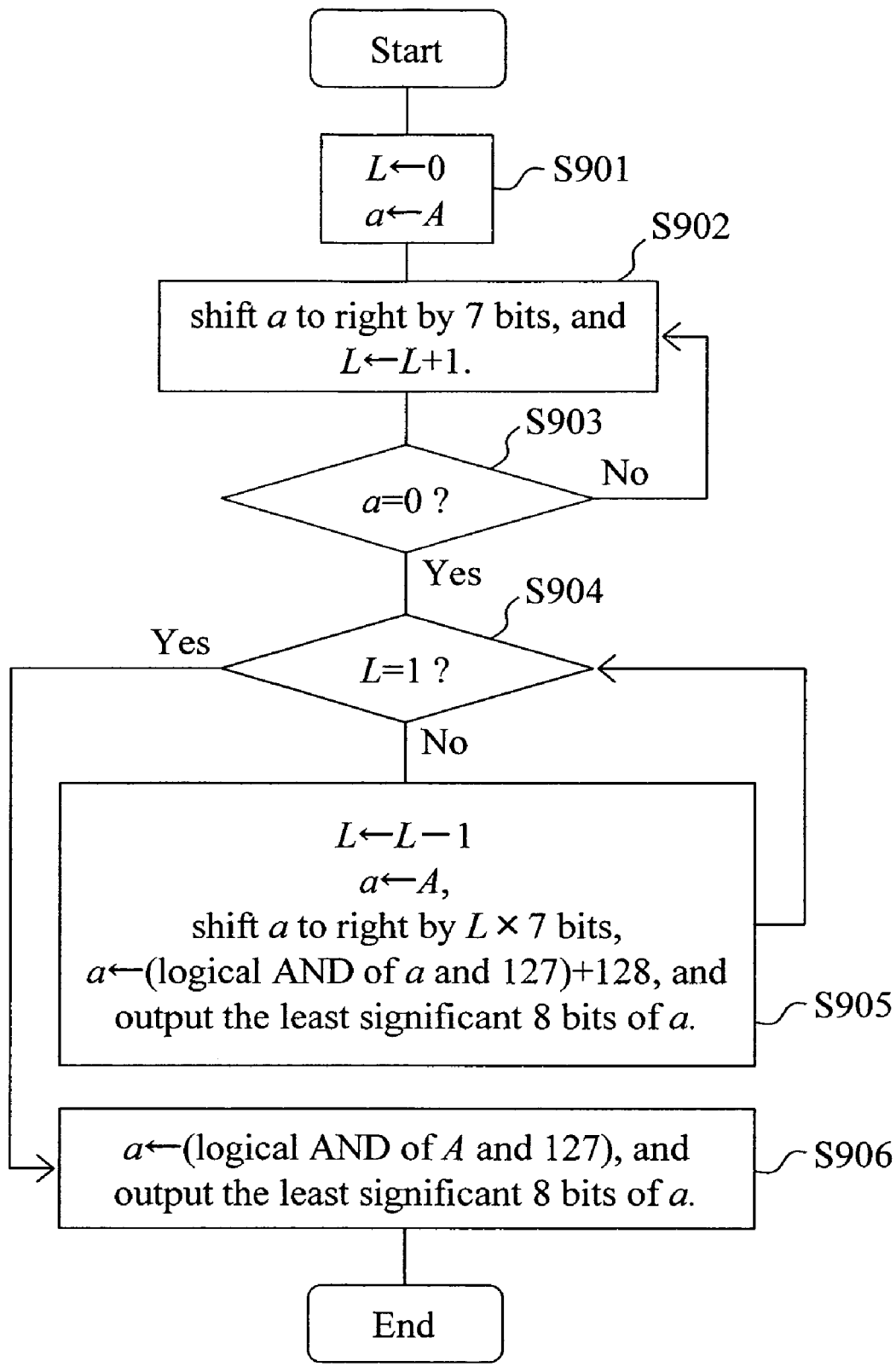
FIG. 9 is a flowchart illustrating an example of processing of outputting a variable byte representation of an integer.

A description will be given for an example of a method for outputting a variable byte representation of an integer A, with reference to FIG. 9. To begin with, in steps S901 to S903, a variable L is set to the minimum natural number n such that the 7×n-th power of 2 is larger than A. Then in a loop of S904 and S905, all bits of A except the least significant 7 bits of A are outputted sequentially starting from the more significant bits, 7 bits at a time. In each iteration of the loop A is copied to a variable a, which in turn is shifted to the right by L×7 bits, and then bits of a other than the least significant 7 bits are set to 0 by performing a logical AND with 127. By adding 128, the eighth bit from the least significant bit is set to 1. Lastly after the loop, the least significant 7 bits of a is outputted in step S906. In step S906, bits other than the least significant 7 bits are set to 0 by performing a logical AND with 127, and the least significant 8 bits are outputted.

Incidentally, if a posting is directly given to this apparatus instead of a search target document, a compressed inverted index can be constructed by omitting the steps S701 to S703, and by executing only the method for compressing postings S704.

Figure 14:
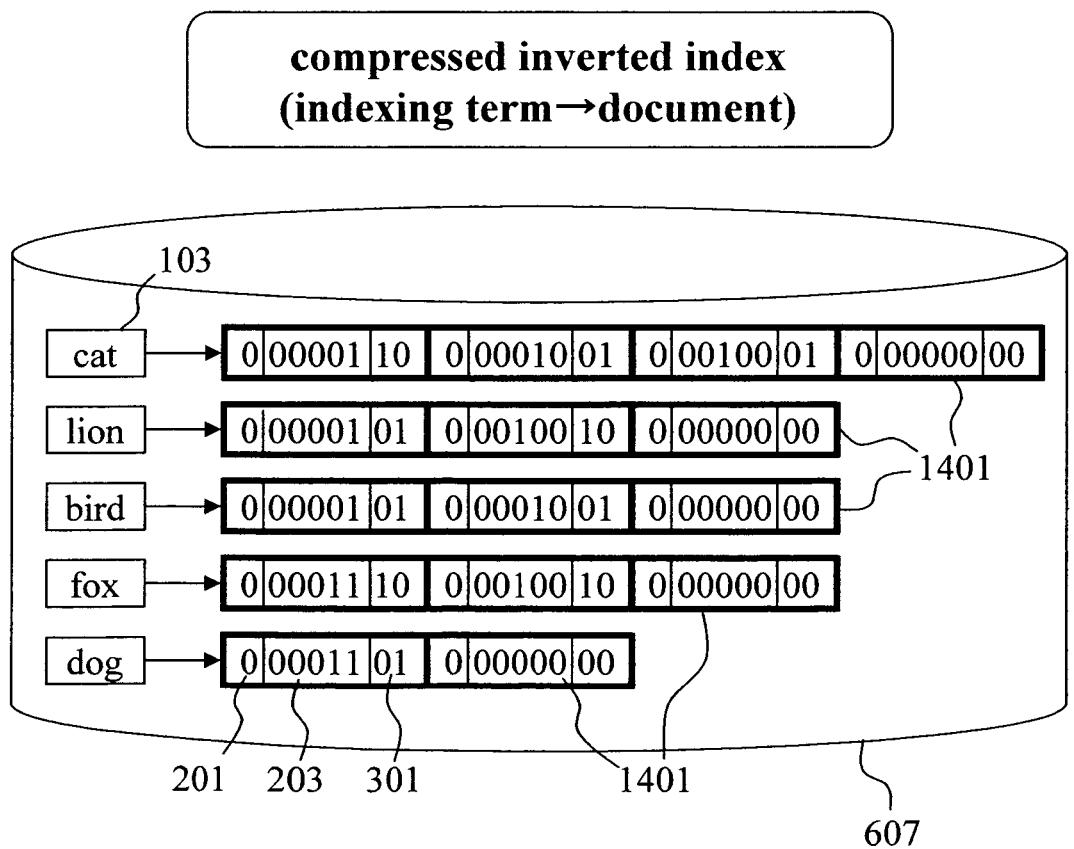
FIG. 14 is an example of a while inverted index compressed by the method of the present invention.

FIG. 14 shows one form of the inverted index 102 in FIG. 1, compressed by the method of the present invention. This figure shows an example where x=0 and w=2. For every indexing term 103, its postings are recorded. Since the number of documents is at most 4 in this example, the docIDs are all represented within a bit area 203 assigned to the docID in the final byte. Since the frequency is at most 2 and can be represented by w=2 bits, every posting can be represented by 1 byte. For this reason, the most significant bits 201 indicating whether or not each of the bytes is an end of the byte sequence, are all set to 0. In an inverted index, information to indicate the end of a posting sequence is required for each indexing term. In FIG. 14, a byte 1401 representing a docID 0 of a non-existing document is used as an end mark of a posting. Instead of placing such a byte at the end of a list, the number of postings or the total bytes of the postings may be recorded to imply the end of the posting.

Figure 10:
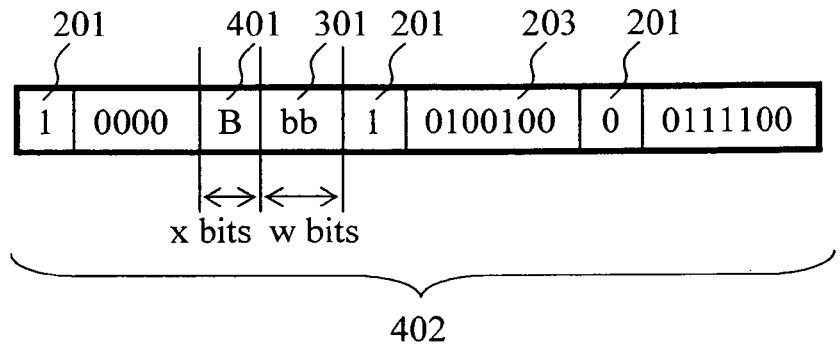
FIG. 10 is a diagram showing a form in which the compression form shown in FIG. 4 is changed, so that the order of a byte sequence corresponding to a posting are reversed.
Figure 11:
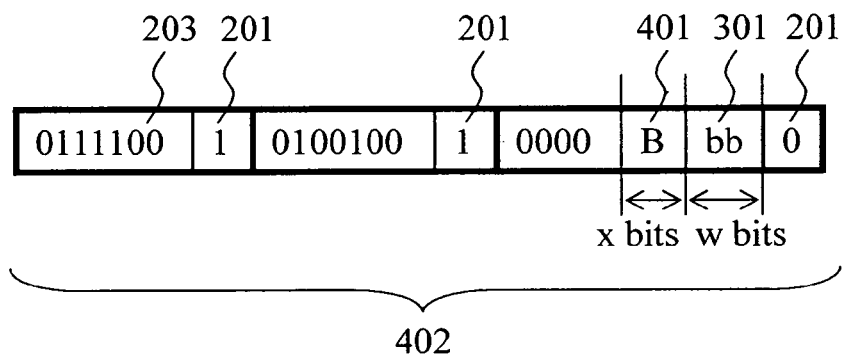
FIG. 11 is a diagram showing a form in which the compression form shown in FIG. 4 is changed, so that a bit indicating whether or not the byte is at the end of a byte sequence is moved from the most significant bit to the least significant bit.
Figure 12:
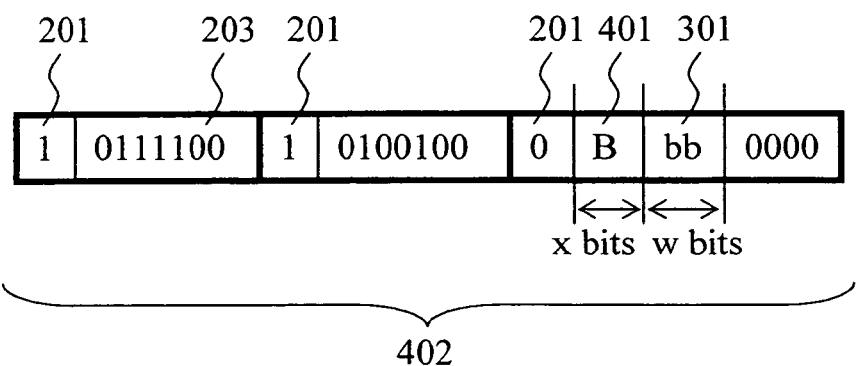
FIG. 12 is a diagram showing a form in which the compression form shown in FIG. 4 is changed, so that a frequency field and an additional information field are moved from the least significant bits to bits near the most significant bit in a final byte of a byte sequence.
Figure 13:
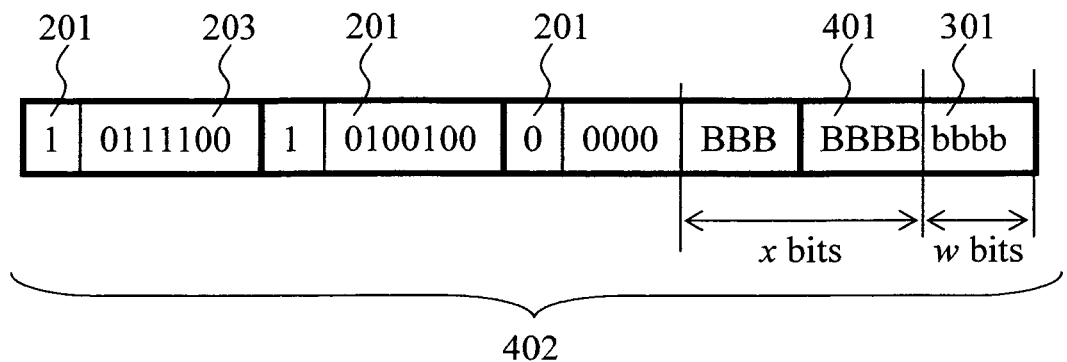
FIG. 13 is an example of a posting compressed by the method of the present invention where x+w is no less than 8.

It should be obvious to those skilled in the art that there are several variations of the method of the present invention for compressing a posting. Although the most significant bit of the docID is stored in the first byte and the least significant bit is stored in the final byte, the order of bytes may be changed to become the reverse order as shown in FIG. 10. Whether or not a byte is the end of a byte sequence may be indicated by the least significant bit (FIG. 11), instead of by the most significant bit. The frequency field and the additional information field may be placed in other bits of the final byte, for example, bits next to the most significant bit (FIG. 12), instead of in the least significant bits thereof. Moreover, the frequency field and the additional information field may be stored in bytes other than the first or the final ones. In a case of outputting a value other than the least significant 7 bits in variable byte representation of an integer, the integer obtained by shifting the given integer to the right by 7 bits is always 1 or more. If the use of a value of 1 or more is thus known in advance, an attempt may be made of reducing the number of bits representing the integer, by subtracting 1 before outputting and adding 1 before decoding (See E Scholer, H. E. Williams, J Zobel, Compression of Inverted Indexes for Fast Query Evaluation, Proc. 25$^{th}$ Ann. Int'l ACM SIGIR Conf. Research and Development in Information Retrieval, pp. 222-229, 2002.). The above variations may be used in combination. Furthermore, improvement of the compression rate may be achieved by sorting the docIDs in increasing order and storing, instead of the original docIDs, differences from the previous docIDs (See I. H. Witten, A. Moffat, and T. C. Bell, Managing Gigabytes: Compressing and Indexing Documents and Images, second ed. San Francisco: Morgan Kaufmann, 1999).

A size and reading speed of the inverted index compressed by the method of the present invention have been compared with other methods in an experiment. The following methods were compared:
(A) Method of the present invention,
(B) No compression performed on either the docID or the frequency,
(C) Both of the docID and the frequency compressed by the variable byte method,
(D) Both of the docID and the frequency compressed by use of the Elias gamma code, and
(E) The docID compressed by use of the Elias delta code, and the frequency compressed by the Elias gamma code.

Data used in the experiment was documents corresponding to 3 years of The Nikkei (one of Japanese major newspapers), and the used indexing terms were words obtained by performing a morphological analysis. In the experiment, we used a computer including a main memory of 1 GB, PentiumIV 1.7 GHz as the CPU, and a Linux OS. The method of the present invention was implemented using the C++ language. In an index, a means for indicating the end of the list of postings of each of the indexing terms is required. In the cases of the method of the present invention and no compression on either one, the end of a posting was indicated by a dummy posting of which the docID was 0. In the other methods, the end of the positing was indicated by a dummy posting of which the frequency was 4, and a frequency f equal to or more than 4 was represented as f+1. In the experiment, the docIDs were sorted in increasing order and differences thereof were obtained, thereafter actually compressing all the postings with each compression method and measuring the sizes of the entire compressed postings. Moreover, the time for reading all of the postings was measured and the reading speed was calculated. As for time measurement, 10 measurements were performed and an average value was employed. Results of the experiment are shown in Table. 1.

TABLE 1

| | compression scheme | | size of inverted index [Mbyte] | time for reading [second] |
|---|---|---|---|---|
| | docID | frequency | | |
| (A) | our invention | our invention | 84.70 | 3.90 |
| (B) | no compression | no compression | 399.63 | 0.83 |
| (C) | variable byte | variable byte | 114.16 | 4.58 |
| (D) | Elias gamma | Elias gamma | 74.29 | 30.59 |
| (E) | Elias delta | Elias gamma | 68.55 | 29.49 |

The size of the inverted index, which is approximately 400 MB when compression is not performed in the method (B), was compressed to 1/3 or less of the original size when any of the methods other than the method (B) was used. The maximum compressibility was achieved when the Elias delta code was used in the method (E) for compression of the docIDs, and the next highest compressibility was achieved when the Elias gamma code was used in the method (D) for compressing the same. The Elias delta code is more suitable than the Elias gamma code for compression of large integers, and thus compressibility of the method (E) was higher than that of (D). Meanwhile, as for the speed of deployment of the compressed posting, the inventors have obtained a result where the decoding processing speed is slow in return for the high compressibility, when using the Elias delta code and the Elias gamma code. In contrast, an extremely high speed was achieved by use of the variable byte method (C).

Compared to other methods, a first feature of the method (A) of the present invention has following strong points. Firstly, its decoding speed was faster than any other compression methods. Secondly, its compression rate was high. As compared to the method (E) having the highest compressibility, the index size obtained by the method of the present invention was only 84.70/68.55=1.23 times of the index size obtained by the method (E). Additionally, the index size was compressed to 84.70/114.16=74.2% of the size obtained by the method (C), that is, the original variable byte method.

Figure 15:
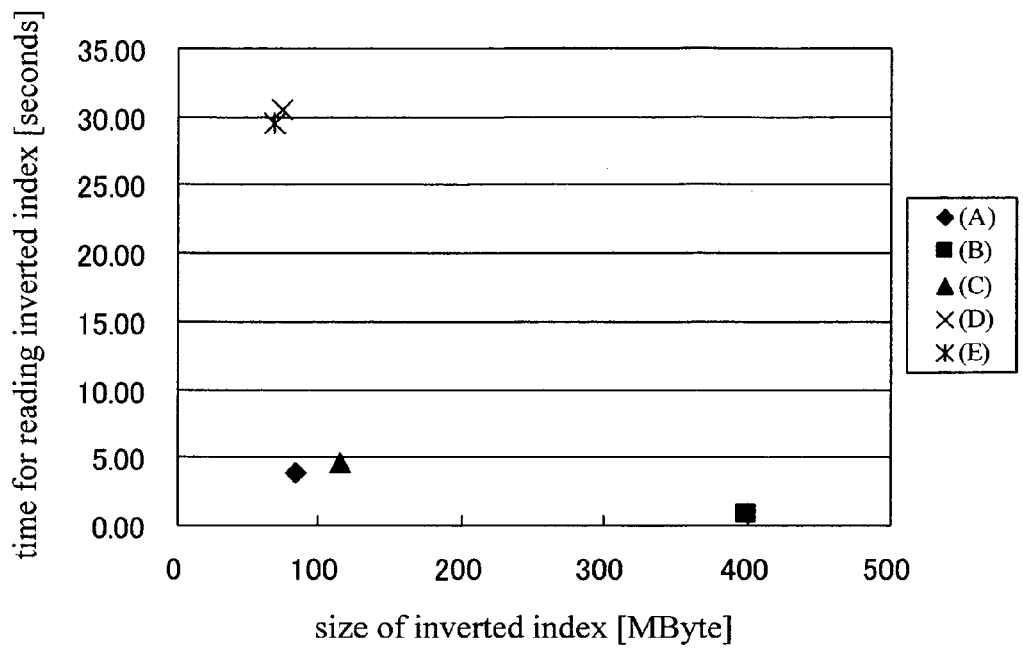
FIG. 15 is a two-dimensional plot of sizes and times required for reading the entire inverted index, with respect to the method of the present invention and other compression methods.

FIG. 15 shows a two-dimensional plot of both of the size of the inverted index after the compression, and time required for reading the whole compressed inverted index, with respect to each of the methods. In this plot, the closer a symbol is to the origin point, the higher the performance of compressibility and decoding speed of the method denoted by the symbol is. The method (E) denoted by "*" had the highest compressibility and the method (B) denoted by "■", that is, the method with no compression had the fastest processing speed. However, high performance is required for both of the compressibility and the processing speed in an actual application. Although not the best performance, the method of the present invention (A) denoted by "♦" in FIG. 15 showed higher performance than most of the other methods for both of the compressibility and the processing speed, and thus can be a useful technique for application.

Second Embodiment

Figure 22:
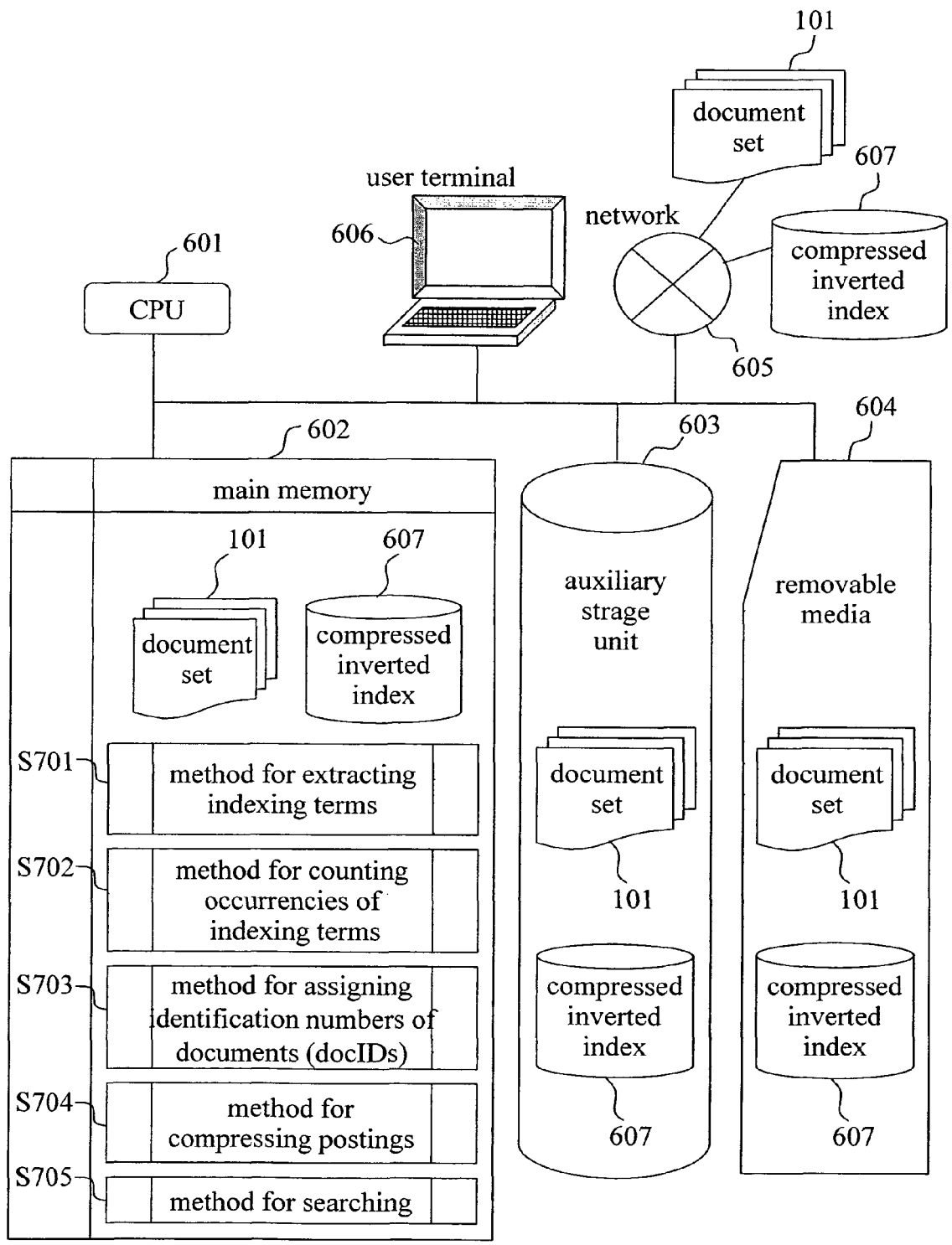
FIG. 22 is a schematic view showing one example of an apparatus implementing the present invention.
Figure 23:
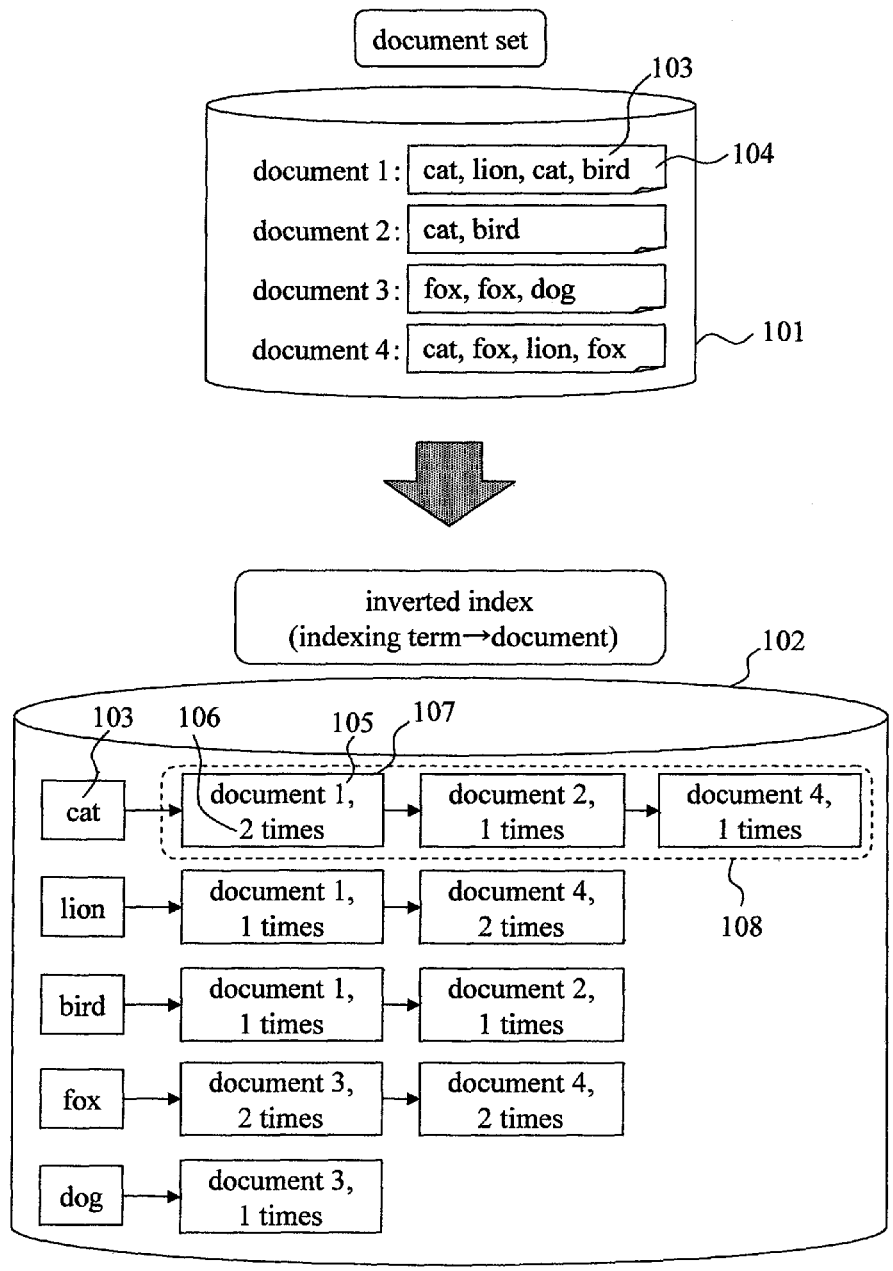
FIG. 23 is an illustrative picture of an inverted list.

Next, a description will be given for an embodiment in which a boundary of a posting can be recognized even when an inverted list 108 is read from the middle instead of from the beginning. FIG. 22 is a schematic view of an apparatus for generating an inverted index compressed by the method of the present invention, and for performing a search with the index.

In the apparatus, a main memory 602 is connected to a central processing unit (CPU) 601. According to need, an auxiliary storage unit 603, a removable media 604 such as a CD-ROM and a DVD, a network 605 and a user terminal 606 are connected. The apparatus of the present embodiment is provided with a program executed by the CPU 601 on the main memory 602 The program conducts: a method for extracting indexing terms S701; a method for counting occurrences of indexing terms S702; a method for assigning docIDs S703; and a method for compressing postings S704. Additionally, the program conducts a method for searching S705 in which a search is performed by use of a generated compressed inverted index 607. Search queries are mainly inputted from a user terminal 606 and passed to the method for searching S705.

Figure 16:
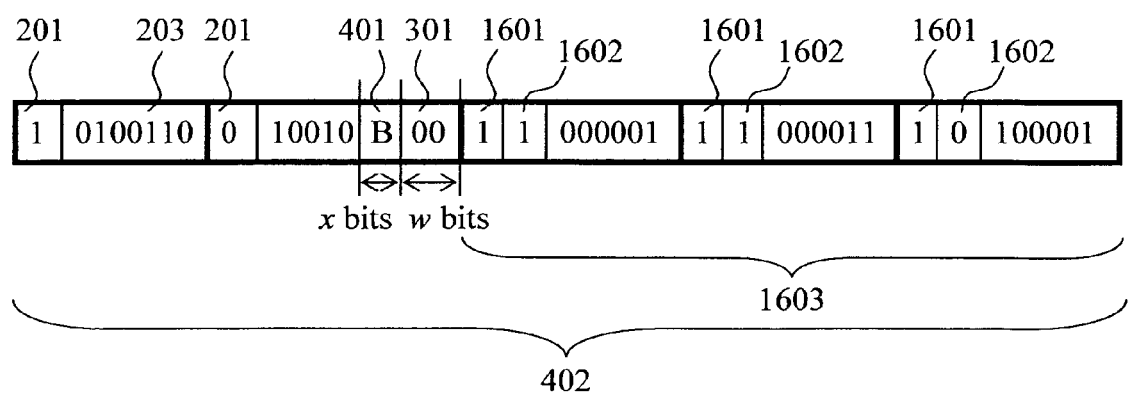
FIG. 16 is an example of a posting compressed by the method of the present invention.

In the present embodiment, the compression form explained in FIG. 5 is partly changed as shown in FIG. 16. Both figures show compression forms of the same postings. However in the one of FIG. 16, the most significant bits 1601 in a byte sequence 1603 indicating the frequency are all 1, and whether or not the byte is the final byte of the byte sequence 1603 is indicated by writing 1 or 0 to the second most significant bit 1602. In the present embodiment, a byte is assumed to be the final byte of the byte sequence 1603 indicating the frequency, when the bit 1602 subsequent to the most significant bit 1601 is 0. The frequency itself is represented by 6 bits in each byte, having excluded the most significant 2 bits (1601, 1602) as similar to the representation by 7 bits in each byte in the variable byte method. In this way, a byte having 0 for the most significant bit in a byte sequence indicating a single posting is the only 1 byte at the end of a byte sequence of variable length in which the docIDs are stored. FIG. 16 is an example of a compressed posting consisting of a docID 1234 (0100110 10010 in binary number representation) and a frequency 4321 (1000011 10001 in binary number representation).

Figure 18:
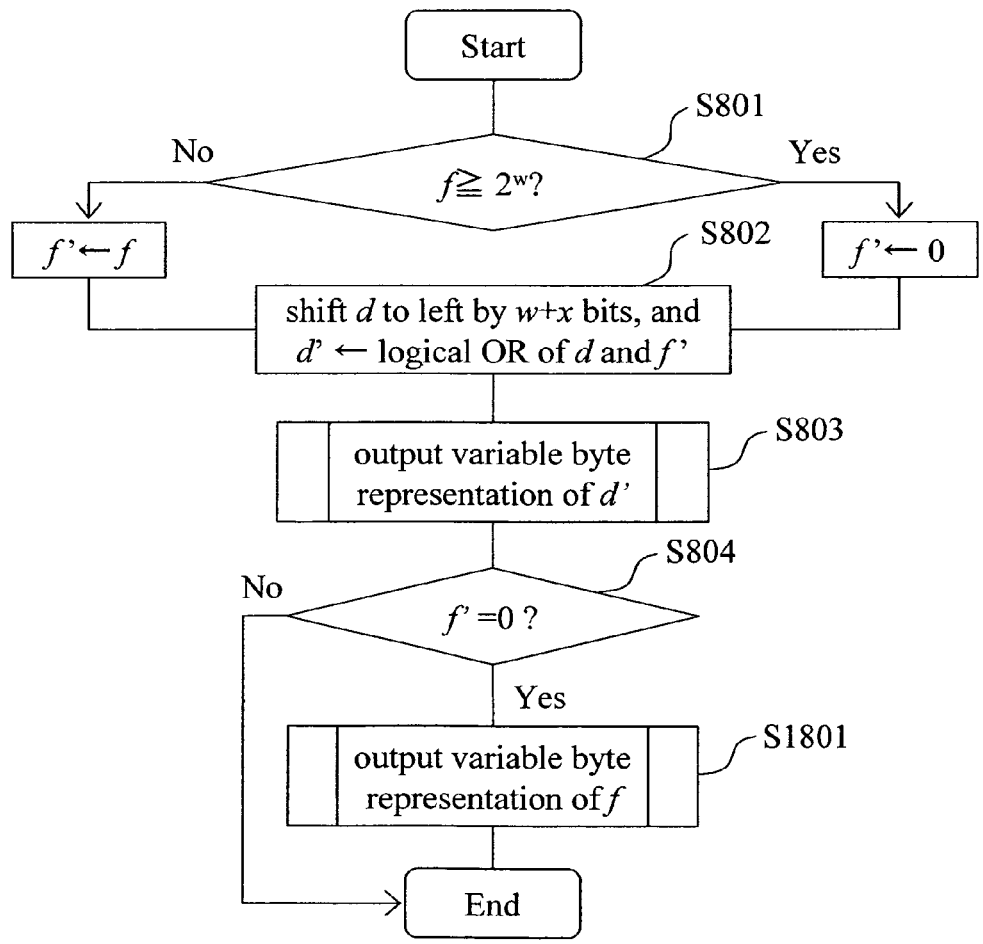
FIG. 18 is a flowchart illustrating an example of posting compression method that allows inverted lists to be read from any position in addition to their beginnings.
Figure 19:
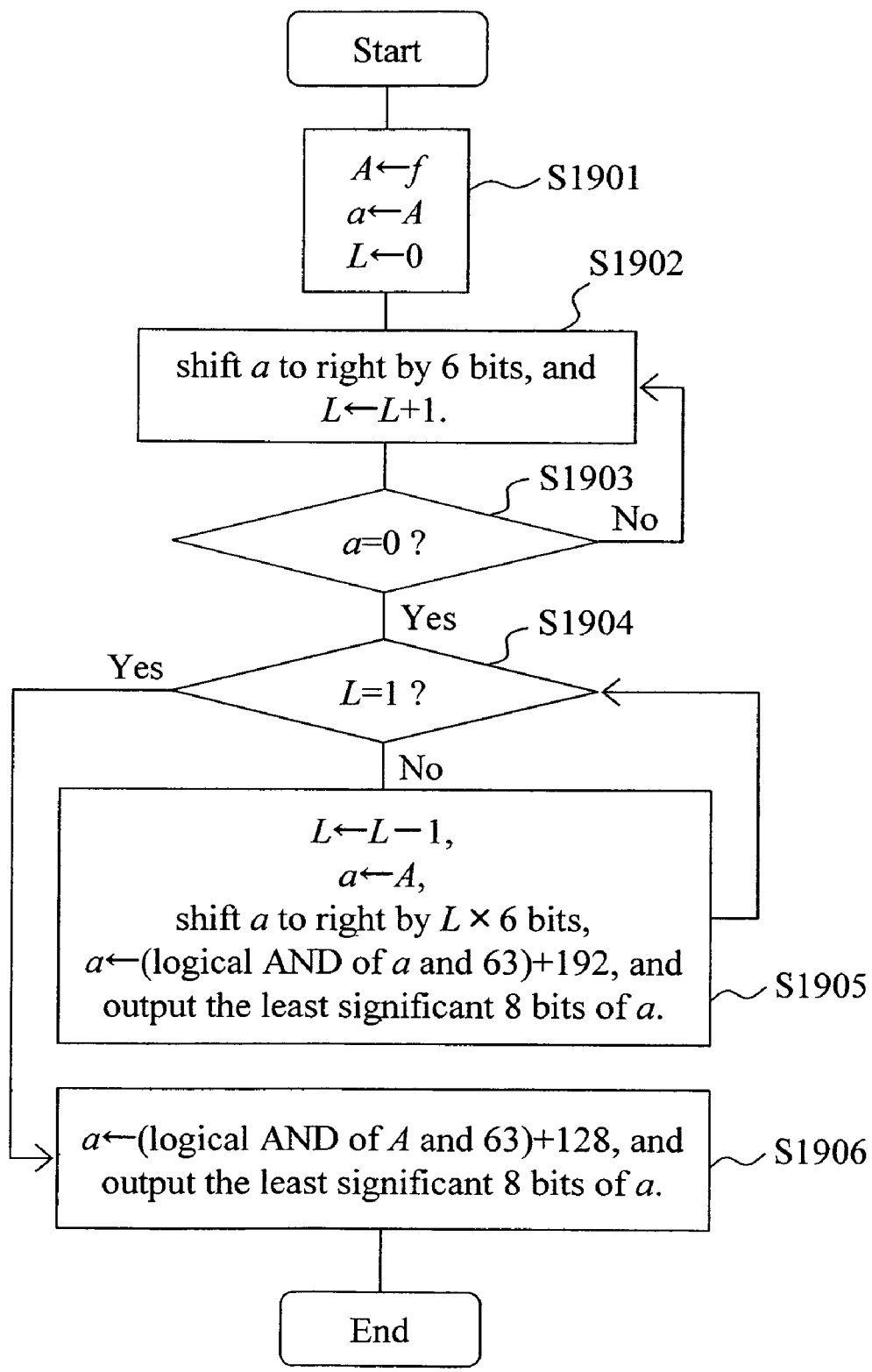
FIG. 19 is a flowchart of processing for outputting a byte sequence representing the frequency, in an example of posting compression method that allows inverted lists to be read from any position in addition to their beginnings.

FIG. 18 shows a flowchart of a method for compressing postings where the inverted list can be read from any position in an inverted list. The processing is almost the same as the flow shown in FIG. 8, except for step S1801 of outputting a byte sequence representing f. Details of this step will be explained with reference to FIG. 19. Firstly, in steps S1901 to S1903, a variable A is set to f, and a variable L is set to a minimum natural number n in which the 6×n-th power of 2 is larger than A. Next, while L>1 in a loop of S1904 and S1905, bits of A other than the least significant 6 bits of A are outputted sequentially starting from the most significant bits, 6 bits at a time. In each iteration of the loop, A is copied to a variable a, which in turn is shifted to right by L×6 bits, and then bits other than the least significant 6 bits are set to 0 by performing a logical AND with 63 (111111 in binary number representation). By adding 192 (11000000 in binary number representation), the eighth bit and seventh bit from the least significant bit is set to 1. Lastly after the loop, the least significant 6 bits of A is outputted in step S1906. The eighth bit from the least significant bit is set to 1 and the seventh bit is set to 0 by performing a logical AND with 63 and adding 128 (10000000 in binary number representation) thereto.

In document search, of frequent use are the Boolean search where a document is searched by designating a combination of words in a Boolean expression such as "(semiconductor AND electricity) OR magnetism", or a phrase search where a document including a phrase that consists of contiguous words such as "future of information technology" is searched for. Hence, it is necessary to execute these kinds of searches at high speed. Consider that a search query that requires documents including both indexing term A and indexing term B is given. In this case, if the indexing term A occurs only in a small number of documents, search processing can be performed only by checking those documents in which the indexing term A occurs, and see whether or not the indexing term B also occurs therein. In other words, firstly, docIDs are from an inverted list of the indexing term A. Secondly, it is examined whether each of the docIDs exists in an inverted list of the indexing term B. If the inverted list of the indexing term B is arranged in the increasing order of the docIDs, and if postings can be read from any position in the inverted list, the check can be accelerated by a binary search.

A description will be given for a binary search method for an inverted list constructed by the method of the present embodiment. Suppose that the frequency is always less than a value obtained by subtracting 1 from the w-th power of 2, a byte is the last one in a byte sequence representing a posting if and only if the most significant bit of the byte if 0. On the other hand, if the frequency is not less than the w-th power of 2, the byte having the most significant bit set to 0 is not the end of the posting since it is followed by the byte sequence 1603 indicating the frequency. However, there is only a single byte of which the most significant bit is 0 in a single byte sequence representing a posting. These facts are utilized to read postings and to thus perform a binary search.

Figure 20:
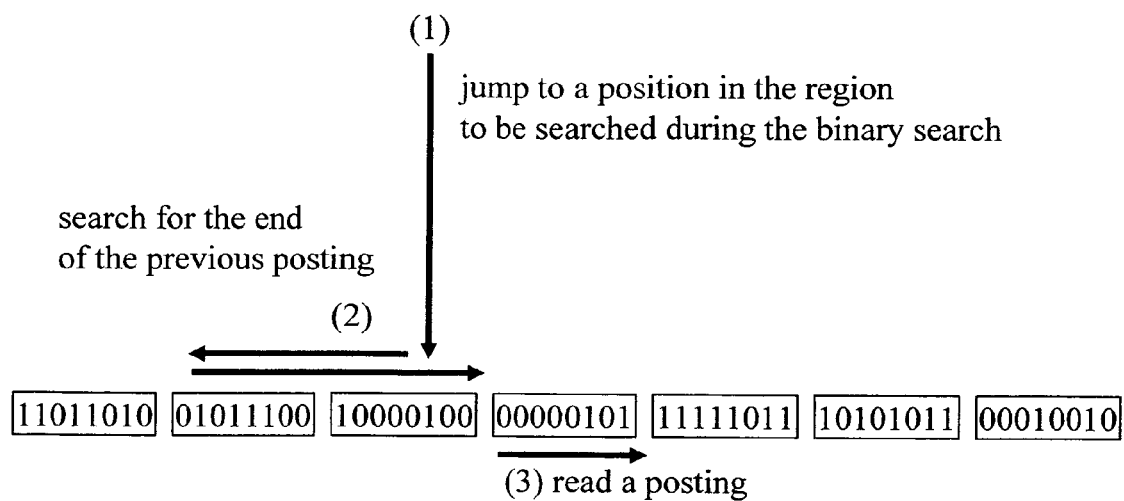
FIG. 20 is a schematic view of processing of searching for a beginning of a posting in an inverted list.
Figure 21:
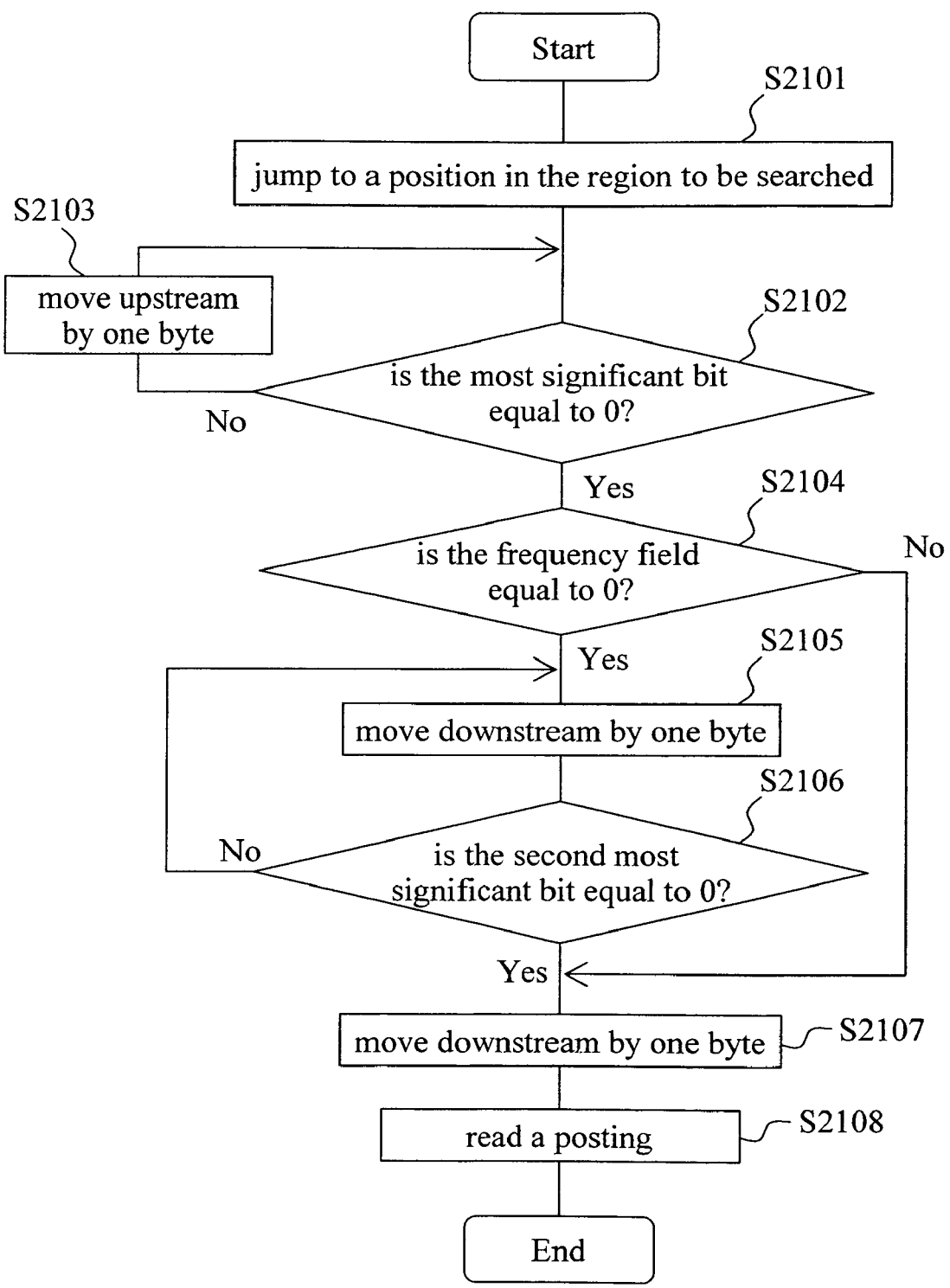
FIG. 21 is a flowchart illustrating a flow of processing for detecting a beginning of a posting.

FIG. 20 is a schematic view of processing of searching for the beginning of a posting, around an arbitrary position of an inverted list for a desired indexing term. FIG. 21 is a flowchart of detecting a beginning of a posting. With reference to these drawings, a description will be given for detecting a beginning of a posting.

(1) Firstly, the search jumps to some position in the inverted list during a binary search (S2101). If this is the first jump in the binary search, the search jumps to the center of the inverted list in this step. If this is the second or subsequent jump, the search jumps to the center of an area yet to be searched in this step S2101.

(2) Next, the byte that is nearest to the position and that has the most significant bit set to 0 is searched from the byte at this position and those in the upstream side. In the loop consisting of S2102 and S2103, the method repeatedly moves upstream by one byte while the most significant bit of the byte at the current position is 1. When a byte of which the most significant bit is 0 is found, the flow proceeds to the next processing S2104.

(3) On finding the byte with the most significant bit set to 0, the final byte of the posting including this byte is searched for. The method of the present invention read the frequency field 301 of the byte with the most significant bit set to 0 found in step S2102 is read. If the frequency field is not 0 in step S2104, the byte is the final byte of the posting. Otherwise, a byte sequence 1603 is provided subsequently. In this case, the search moves downstream until it finds a byte having a bit 1602, subsequent to the most significant bit 1601, set to 0 (S2105 and S2106). The byte found is the final byte of the byte sequence representing the posting. The subsequent byte of the final byte of a posting is a first byte of another posting. Therefore after moving downstream by one byte (S2107), a posting can be read (S2108).

In this way, the inverted list consisting of postings compressed by the method of the present invention can be read from any position in addition to the beginning, and therefore a binary search can be performed. As a result, a posting corresponding to a specific document can be found quickly without having to read the inverted index sequentially from the beginning. When a length of an inverted index of an indexing term is denoted by L, an average of L/2 postings need to be read to reach a posting corresponding to a specific document in the case of reading the document sequentially from the beginning. However, by use of the above-mentioned binary search, the number of postings that need to be read is reduced in the order of log (L). By means of this binary search, queries that require documents containing combinations of words can be accelerated.

When a Boolean search expression or a phrase query that requires multiple indexing terms is provided from a user terminal 606 of the apparatus shown in FIG. 22, a binary search is performed in the following manner. Here, assume that an exemplar search expression "(indexing term A) and (indexing term B)" is inputted from the user terminal 606. In response to this input, a method for searching S705 selects the shorter of the inverted list of the indexing term A and that of B. Assume the inverted list of the indexing term A is selected. Then, all docIDs d1, d2, d3, . . . etc. in the inverted list of the indexing term A are extracted. After that, method for searching S705 searches the inverted list of the indexing term B for each of the docIDs d1, d2, d3, . . . etc. by a binary search. During the binary search, postings in the inverted list of the indexing term B are read by performing the processing for detecting a beginning of a posting described by reference to FIGS. 20 and 21. By the binary search, a determination is made on whether or not the docID being searched for is included in the inverted index of the indexing term B. For example, consider a docID d1. Let d' be the docID of a posting in the center of the inverted list of the indexing term B, which is detected by the method shown in FIG. 21. Assume that d' is larger than d1. Then, a binary search is similarly performed for a portion of the list previous to the center, because if the docID d1 is included in the inverted index of the indexing term B, the docID d1 should be in a portion previous to the posting that has just been read. On the other hand, in a case where d' is smaller than d1, a binary search is similarly performed for the portion subsequent to the center. By repeating this operation, the docID d1 is searched for to see if d1 exists in the inverted list of the indexing term B. Similarly, d2 and d3 can be searched for by the binary search to see if they exist in the inverted index of the indexing term B. Documents having the docIDs included in the inverted index of the indexing term B, among the docIDs (d1, d2, d3 and the like) included in the inverted index of the indexing term A are documents that satisfy the query "(indexing term A) and (indexing term B)." After it obtains those docIDs, the method for searching S705 outputs the docIDs or the documents themselves that correspond to the docIDs to the user terminal 606, and the search is completed.

Figure 17:
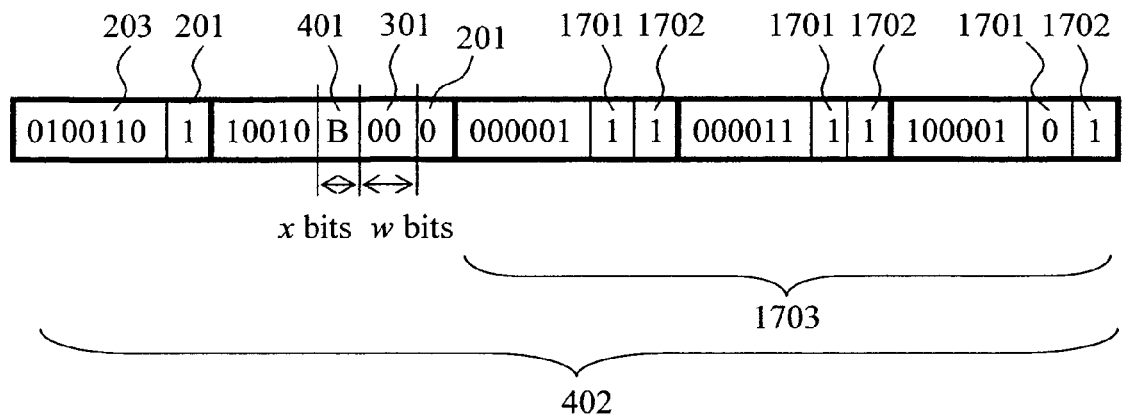
FIG. 17 is an example of a posting compressed by the method of the present invention.

It should be obvious to those skilled in the art that as similar to the first embodiment, the posting compression method of the present embodiment also includes multiple variations. Instead of storing the most significant bit of a docID in the first byte and the least significant bit in the final byte of the byte sequence representing a posting, the byte order may be reversed. Instead of indicating by the most significant bit whether or not a byte is the final byte of a byte sequence of variable length representing a docID, the least significant bit may be used. In this case, as shown in FIG. 17, in the additional byte sequence 1703 representing the frequency, the least significant bits 1702 are fixed to 1, and whether or not the byte is a final byte of the additional byte sequence 1703 can be indicated by the second least significant bit 1701. In a case of outputting a value other than the least significant 7 bits in variable byte representation of an integer, the integer obtained by shifting the given integer to right by 7 bits is always 1 or more. If the use of a value of 1 or more is thus known in advance, an attempt may be made of reducing the number of bits representing the integer, by subtracting 1 before outputting and adding 1 before decoding (See F. Scholer, H. E. Williams, J. Zobel, Compression of Inverted Indexes for Fast Query Evaluation, Proc. $25^{th}$ Ann. Int'l ACM SIGIR Conf. Research and Development in Information Retrieval, pp. 222-229, 2002.). The same technique can be used in the processing S1801 of outputting the frequency of occurrences 6 bits at a time. In addition, improvement of compressibility may be attempted by sorting the docIDs in increasing order and obtaining the differences (See I. H. Witten, A. Moffat, and T. C. Bell, Managing Gigabytes: Compressing and Indexing Documents and Images, second ed. San Francisco: Morgan Kaufmann, 1999). The above variations may be used in combination.

In some cases an inverted list may be divided and stored in more than one contiguous memory area. As has been described above, the compressibility of a docID in a posting can be improved by recording a difference between the docID in the posting and a docID in a posting immediately therebefore. However, in order to perform a binary search in the individual continuous areas within the discontinuous areas, the following modifications, for example, are required: (1) the docIDs are recorded directly without obtaining the differences, (2) only the docIDs placed at the beginning of blocks are recorded directly without obtaining the differences, whereas with respect to docIDs except for the ones placed at the beginning of blocks, the differences from the docIDs placed at the beginning of the blocks are written.

In a binary search, it is preferable to switch to a sequential search (a method for searching a posting by reading the postings sequentially) after the range to be searched becomes small enough. Since the binary search of the present embodiment requires processing for detection of boundaries of postings, the use of a sequential search may be more efficient when the search range is small (such as approximately 10 bytes).

The present invention provides a technique for implementing full-text search at a high speed. While high speed processing is made possible, there is only a small increase in the amount of data even when the technique is compared to Elias gamma, delta, Golomb or Rice codes that are known to be effective. This is attributable to the simple compression method of the present invention. Moreover, since a binary search can be performed in the inverted list, advanced search methods such as a phrase search and the Boolean search can be accelerated.

What is claimed is:

1. A non-transitory computer readable recording medium in which a compressed inverted index is recorded, the compressed inverted index being a data structure storing postings, for every indexing term in a document set, where the document set is searchable by referencing the compressed inverted index, including a plurality of documents respectively assigned identification numbers, each posting having an identification number of a document in which the indexing term occurs, a number of occurrences of the indexing term in the document and information indicating an end of a byte sequence representing the identification number, the indexing term being defined as either a word or a plurality of contiguous letters and the number of occurrences of the indexing term being stored in a frequency field of the posting corresponding to the identification number of the document, wherein, in the compressed inverted index, the identification number of a document in each posting is represented by a byte sequence of variable length including an indicator of an end of the byte sequence, wherein the number of occurrences from 1 to $(2^w-1)$ is represented by w bits within the byte sequence where w is a given integer of not less than 1 and not more than 8, and wherein the number of occurrences greater than or equal to $2^w$ is represented by an additional byte sequence including another indicator of an end of the byte sequence.

2. The non-transitory computer readable recording medium according to claim 1, wherein a region for writing additional information is provided in x bits of the byte sequence representing the posting, where x is a given integer and x+w is not less than 1 and not more than 8.

3. The non-transitory computer readable recording medium according to claim 1, wherein the number of occurrences is stored at a location in the byte sequence selected from the group consisting of the most significant w bits of the first byte, the most significant w bits of the final byte, least significant w bits of the first byte, and the least significant w bits of the final byte.

4. The non-transitory computer readable recording medium according to claim 2, wherein the number of occurrences and the additional information are stored at a location in the byte sequence selected from the group consisting of the most significant x+w bits of the first byte, the most significant x+w bits of the final byte, least significant x+w bits of the first byte, and the least significant x+w bits of the final byte.

5. A computer with a computation device for performing a compressed inverted index generation for a plurality of documents which are input to the computation device, where the plurality of documents are searchable by referencing the compressed inverted index, comprising:

means for extracting at least one indexing term from each of the plurality of documents included in a document set, where an indexing term is defined as either a word or a plurality of contiguous letters;

means for counting the number of occurrences of each of the at least one indexing terms in the plurality of documents;

means for assigning a different document identification number to each one of the plurality of documents in the document set; and means for compressing postings, where each posting includes the identification number of one of the documents, the number of occurrences of one of the at least one indexing terms in the document and information indicating an end of a byte sequence representing the identification number, the number of occurrences of the one of the at least one indexing terms being stored in a frequency field of the posting corresponding to the identification number of the document, wherein the means for compressing postings causes the identification number of each document in each posting to be represented by a byte sequence of variable length including an indicator of an end of the byte sequence, wherein the means for compressing postings causes the number of occurrences from 1 to $(2^w-1)$ to be represented by w bits within the byte sequence where w is a given integer of not less than 1 and not more than 8, and wherein the means for compressing postings causes the number of occurrences greater than or equal to $2^w$ to be represented by an additional byte sequence including another indicator of an end of the byte sequence.

6. The computer with a computation device for performing the compressed inverted index generation according to claim 5, wherein a region for writing additional information is provided in x bits of the byte sequence representing the posting, where x is a given integer and x+w is not less than 1 and not more than 8.

7. The computer with a computation device for performing the compressed inverted index generation according to claim 5, wherein the number of occurrences is stored at a location in the byte sequence selected from the group consisting of the most significant w bits of the first byte, the most significant w bits of the final byte, least significant w bits of the first byte, and the least significant w bits of the final byte.

8. The computer with a computation device for performing the compressed inverted index generation according to claim 6, wherein the number of occurrences and the additional information are stored at a location in the byte sequence selected from the group consisting of the most significant x+w bits of the first byte, the most significant x+w bits of the final byte, least significant x+w bits of the first byte, and the least significant x+w bits of the final byte.

9. A compressed inverted index generation method comprising the steps of:

inputting a document set, which is searchable by referencing the compressed inverted index, including a plurality of documents;

extracting an indexing term that is either a word or a plurality of contiguous letters from each of documents of the document set;

counting a number of occurrences of each indexing term in the documents;

assigning a different document identification number to each document in the document set;

compressing a posting that includes an identification number of a document, a number of occurrences of an indexing term in the document and information indicating an end of a byte sequence representing the identification number, the number of occurrences of the indexing term being stored in a frequency field of the posting corresponding to the identification number of the document; and outputting an inverted index including the compressed posting, wherein in the step of compressing a posting, the identification number of a document in each posting is represented by a byte sequence of variable length including an indicator of an end of the byte sequence, wherein the number of occurrences is represented by w bits within the byte sequence if the number of occurrences is 1 to $(2^w-1)$ where w is a given integer of not less than 1 and not more than 8, and wherein the number of occurrences is represented by an additional byte sequence including another indicator of an end of the byte sequence if the number of occurrences is greater than or equal to $2^w$.

10. The compressed inverted index generation method according to claim 9, wherein additional information is written in x bits of the byte sequence representing the posting, where x is a given integer and x+w is not less than 1 and not more than 8.

11. The compressed inverted index generation method according to claim 9, wherein the number of occurrences is stored at a location in the byte sequence selected from the group consisting of the most significant w bits of the first byte, the most significant w bits of the final byte, least significant w bits of the first byte, and the least significant w bits of the final byte.

12. The compressed inverted index generation method according to claim 10, wherein the number of occurrences and the additional information are stored at a location in the byte sequence selected from the group consisting of the most significant x+w bits of the first byte, the most significant x+w bits of the final byte, least significant x+w bits of the first byte, and the least significant x+w bits of the final byte.

13. A computer with a computation device for performing a compressed inverted index generation for a plurality of documents which are input to the computation device, where the plurality of documents are searchable by referencing the compressed inverted index, comprising:

means for extracting at least one indexing term that is either a word or a plurality of contiguous letters from each of the plurality of documents included in a document set;

means for counting occurrences of indexing terms for counting the number of occurrences of each of the at least one indexing terms in the plurality of documents;

means for assigning document identification numbers for assigning a different document identification number to each one of the documents in the document set; and means for compressing postings, where each posting includes the identification number of one of the documents, a number of occurrences of one of the at least one indexing terms in the document and information indicating an end of a byte sequence representing the identification number, the number of occurrences of the one of the at least one indexing terms being stored in a frequency field of the posting corresponding to the identification number of the document, wherein the means for compressing postings causes the identification number of each document in each posting to be represented by a byte sequence of variable length including an indicator of an end of the byte sequence that indicates by a bit in a specific location in each byte whether or not the byte is the final byte of a byte sequence representing the document identification number, wherein the means for compressing postings causes the number of occurrences from 1 to $(2^w-1)$ to be represented by w bits of the byte sequence where w is a given integer of not less than 1 and not more than 8, wherein the means for compressing postings causes the number of occurrences greater than or equal to $2^w$ to be represented by an additional byte sequence including another indicator of an end of the byte sequence, and wherein the means for compressing postings indicates by a bit adjacent to the bit in the specific location whether or not the byte is the final byte of the additional byte sequence.

14. The computer with a computation device for performing the compressed inverted index generation according to claim 13, wherein a region for writing additional information is provided in x bits of the byte sequence representing the posting, where x is a given integer and x+w is not less than 1 and not more than 8.

15. The computer with a computation device for performing the compressed inverted index generation according to claim 13, wherein the number of occurrences is stored at a location in the byte sequence selected from the group consisting of the most significant w bits of the first byte, the most significant w bits of the final byte, least significant w bits of the first byte, and the least significant w bits of the final byte.

16. The computer with a computation device for performing the compressed inverted index generation according to claim 14, wherein the number of occurrences and the additional information are stored at a location in the byte sequence selected from the group consisting of the most significant x+w bits of the first byte, the most significant x+w bits of the final byte, least significant x+w bits of the first byte, and the least significant x+w bits of the final byte.

* * * * *